United States Patent [19]

Ronzoni

[11] Patent Number: 5,092,206

[45] Date of Patent: Mar. 3, 1992

[54] TOOLHOLDER FOR AN AUTOMATIC LATHE

[75] Inventor: Enrico Ronzoni, Bergamo, Italy

[73] Assignee: Gildemeister Italiana S.p.A., Brembate Sopra, Italy

[21] Appl. No.: 557,301

[22] Filed: Jul. 23, 1990

[30] Foreign Application Priority Data

Oct. 20, 1989 [IT] Italy ................... 22078 A/89

[51] Int. Cl.$^5$ ............................................. B23B 29/00
[52] U.S. Cl. ........................................ 82/158; 82/160
[58] Field of Search ............. 82/157, 158, 160, 99.1, 82/161; 407/101–105, 110, 117; 29/50, 52

[56] References Cited

U.S. PATENT DOCUMENTS

| | | | |
|---|---|---|---|
| 3,289,273 | 12/1966 | Artaud | 407/101 |
| 3,545,318 | 12/1970 | Anderson | 82/158 |
| 3,731,565 | 5/1973 | Barkhurst | 82/158 X |
| 4,209,047 | 6/1980 | Weill | 407/103 X |
| 4,520,701 | 6/1985 | Watamura | 82/158 |
| 4,759,244 | 7/1988 | Engibarov | 82/158 X |

Primary Examiner—Larry I. Schwartz
Assistant Examiner—J. R. Daulton
Attorney, Agent, or Firm—Ladas & Parry

[57] ABSTRACT

Toolholder for an automatic lathe, in which the body of the toolholder has on its bottom side a projecting rib extending parallel to the axis (X) of the workpiece to be machined and the projecting rib may be coupled with a groove formed in a retaining support of the machine and oriented parallel to the axis of the workpiece, wherein moreover the retaining support receiving the toolholder has parallel grooves which are oriented radially with respect to the axis (X) of the workpiece to be machined and wherein strips can be inserted in these grooves, with which screws can be engaged for clamping the toolholder.

6 Claims, 4 Drawing Sheets

TOOLHOLDER FOR AN AUTOMATIC LATHE

BACKGROUND OF THE INVENTION

The above invention relates to a toolholder for an automatic lathe.

Toolholders are already known from the prior art, consisting of a body receiving the tool to be used. The receiving body, together with the tool, is secured on a corresponding support of the automatic lathe.

The use of these known toolholders results in an improvement in the productivity of the machine; furthermore preset tools can be used, resulting in fast and very precise mounting of the tool in the machine.

As a result of the reduction in the machine setting-up times and a decrease in the idle time, which hitherto was unavoidable when changing the tool, a reduction in the downtime of the machine and hence greater use of the productive means is achieved.

In particular in the case of multiple-spindle lathes, in which 5 to 15 different tools are used, it is extremely important to be able to replace the numerous tools used in a minimum amount of time.

A rapid-change toolholder is already known, where positioning of the tools with respect to the workpiece to be machined is performed with the aid of a series of ground column-like supporting elements. The toolholder, which has correspondingly formed cavities, is brought into engagement with these column-like components.

On the machine-tool support, the known toolholders are clamped with the aid of clamping means oriented parallel to the axis of the workpiece to be machined, for example with the aid of the column-like components. Considering that, in this constructional form, both the column-like components and the clamping means are always oriented parallel to the axis of the workpiece to be machined, the drawback arises that during clamping of the toolholder, the toolholder inevitably becomes inclined with respect to the longitudinal axis of the workpiece to be machined. This results in considerable imprecision during machining of the workpiece with the cutting tool.

Furthermore, the known toolholders have the drawback that disassembly of the toolholder clamping means is possible only in the direction of the longitudinal axis of the workpiece, i.e. in the direction of the longitudinal axis of the lathe. This requirement, which arises during assembly and and disassembly of the toolholder, involves considerable drawbacks since auxiliary devices for the machine are provided laterally with respect to the toolholder supports and hinder the free and fast disassembly of the toolholders.

SUMMARY OF THE INVENTION

The object of the above invention is to overcome the drawbacks of the prior art and to propose a toolholder which may be mounted with greater precision on the associated machine-tool support, allowing precise positioning of the tool parallel to the axis of the workpiece to be machined, firm clamping of the toolholder over the entire bearing surface of the support, and rapid assembly or rapid disassembly of the clamping means by performing a radial movement with respect to the axis of the workpiece.

This object is achieved according to the invention in that the body of the toolholder has on its bottom side a projecting fillet extending parallel to the axis of the workpiece to be machined, in that the projecting fillet may be coupled with a groove formed in the body of the receiving device and oriented parallel to the axis of the workpiece, in that the receiving device for the toolholder has parallel securing grooves which are oriented radially with respect to the axis of the workpiece and receive strips with which toolholder clamping screws engage.

This type of toolholder can be assembled with maximum speed in its working position, the fillet projecting from the toolholder being brought into engagement with the groove of the receiving device of the machine. Inside this groove the body of the toolholder may be freely displaced so that a positional adjustment can be performed with respect to the receiving device.

Subsequently, by inserting the corresponding securing strips in the radial direction and with the aid of screws, the toolholder is firmly clamped on the holding device of the machine.

By providing a longitudinal guiding groove in the fixed receiving device of the machine (a guiding groove formed as a precision guide and arranged parallel to the axis of the workpiece to be machined) and by providing grooves for introducing clamping strips arranged perpendicularly with respect to the axis of the workpiece, very precise positioning of the preset tool with respect to the workpiece is obtained, as well as rigid and very precise clamping of the toolholder, without undesired twisting wih respect to the receiving device.

The coupling between the projecting fillet and the groove in the receiving device is performed easily by a movement from above and the introduction of the T-shaped clamping parts into the corresponding grooves of the receiving device is performed in a radial direction with respect to the workpiece. The T-shaped strips or wedges are introduced from the side of the lathe which is completely free of the machine component groups and therefore allows free and rapid access.

BRIEF DESCRIPTION OF THE DRAWINGS

The subject of the invention will now be described in greater detail by means of an example of embodiment and illustrated in the drawings, in which.

DETAILED DESCRIPTION OF THE PREFERRED EMBODIMENT

Figure 1:
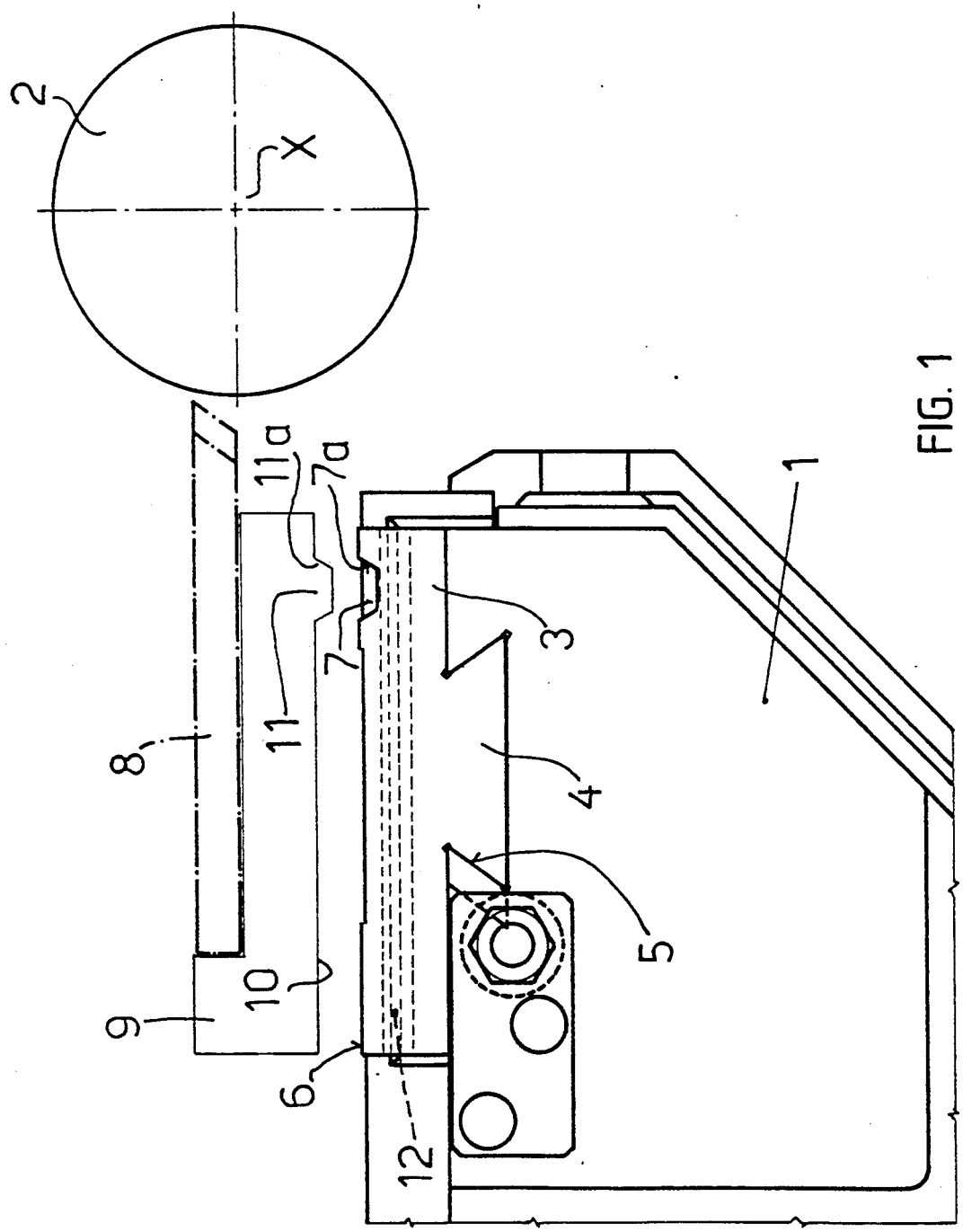
FIG. 1 shows in schematic form a front view of the receiving device with the toolholder.

A known receiving device for a toolholder, conventional in lathes, can be seen in FIG. 1.

As is known, several receiving devices are provided for different toolholders, arranged in the form of a star around the longitudinal axis of the machine. The tool of each receiving device is used for machining on the associated workpiece 2 which is received by a machine spindle, not shown.

The receiving device 1 has a platform 3. The platform 3 is received slidably with the aid of a dovetailed guide 4 and adjustably by a dovetailed guide 5 formed in the receiving device 1. The possibility thus exists of adjusting the platform 3 in the direction of the axis X of the workpiece 2.

On its upper side, the platform 3 has a supporting surface 6 advantageously executed as a ground supporting surface. The platform 3 has on the front side, i.e. on the side directed towards the workpiece 2, a groove 7 oriented parallel to the axis X of the workpiece 2. The groove 7, which has a frustoconical cross-sectional shape, has wall sides 7a inclined downwards. The bottom surface, as well as the side walls 7a of the groove 7, are advantageously ground.

The tool 8 is mounted in a known manner in a preset position in the body of the toolholder 9. The toolholder 9 is formed as a rapid-change toolholder. The toolholder 9 consists essentially of a body which has on its bottom side a ground surface 10. On the front side of the toolholder 9, directed towards the workpiece 2 to be machined, there projects from the bottom 10 a fillet 11 arranged parallel to the front side of the toolholder 9. The body of the toolholder 9 as well as the fillet 10 [sic] form a single unit.

The fillet 11 also has a frustoconical shape and the wall sides 11a delimiting the fillet 11 are also ground. The inclination of the wall sides 11a is chosen such that precise coupling with the groove 7 in the platform 3 can be obtained By inserting the fillet 11 into the groove 7, not only does the surface 10 of the toolholder rest on the surface 6 of the platform 3, but also a positive and precise coupling is obtained between the fillet 11 and the groove 7. This ensures alignment of the toolholder 9 exactly parallel to the longitudinal axis X of the workpiece 2.

The platform also has a number of parallel grooves 12 oriented perpendicularly with respect to the groove 7 and therefore with respect to the axis X of the workpiece 2.

Figure 2:
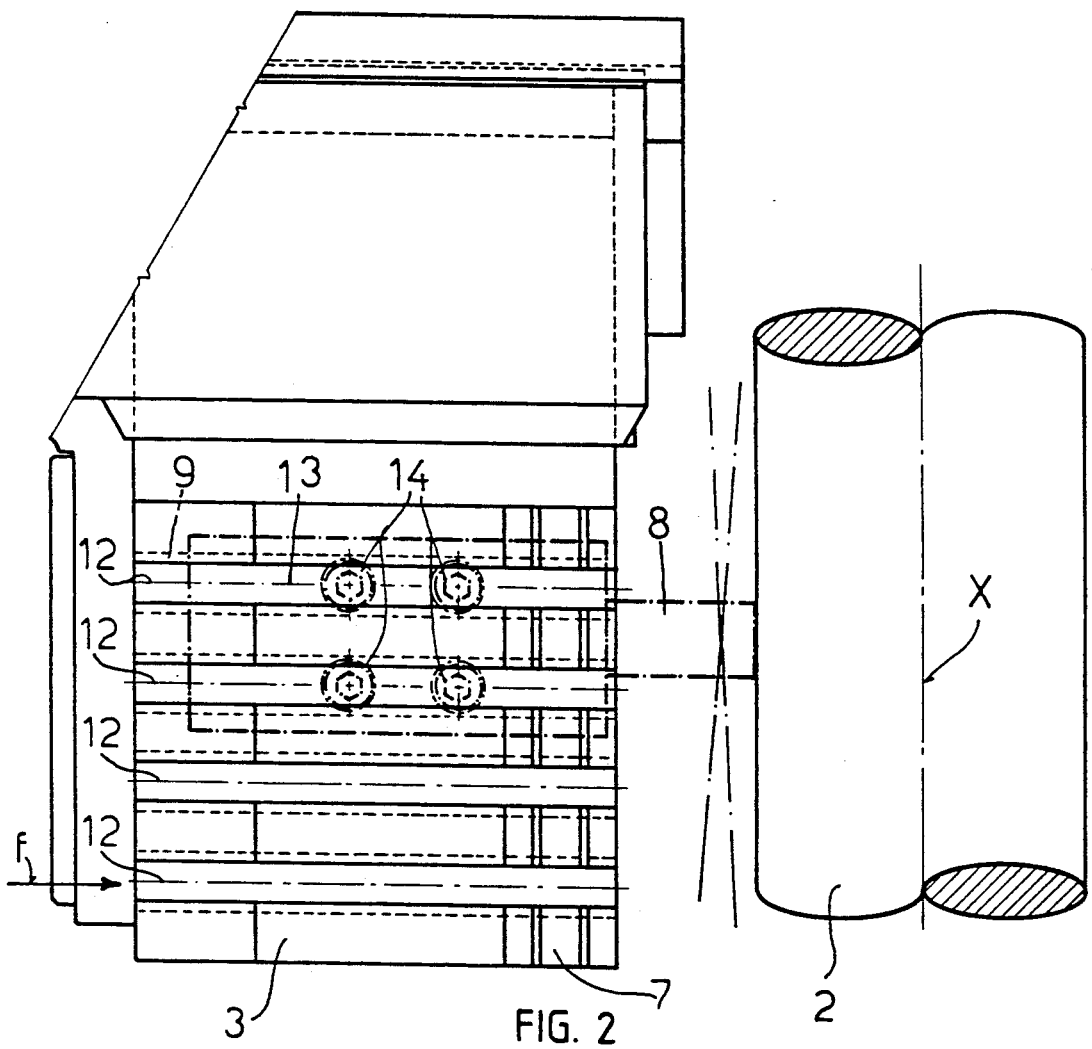
FIG. 2 shows a plan view of the receiving device and the toolholder.

As can be seen moreover from FIG. 2, the toolholder 9, illustrated only in schematic form, is first positioned (depending on its width) above the grooves 12 advantageously formed as T-grooves. Then the toolholder 9 is clamped with the aid of T-shaped strips 13 which are joined with screws 14.

From FIGS. 1, 2, 3 and 4 it can be clearly seen that the prismatic groove 7 in the platform 3 is oriented parallel to the axis X of the workpiece 2. Through combination with the prismatic fillet 11, projecting from the bottom side of the toolholder 9, very precise positioning of the tool with respect to the workpiece is effected. Both the groove 7 and the fillet 11 may be easily and rapidly cleaned and freed from any deposited swarf or particles of dirt. The set tools 8 can be rapidly inserted without additional auxiliary means. After insertion of the toolholder, the T-shaped strips 13 are pushed into the grooves 12 of the platform 3. As a result, it becomes possible to secure the toolholder 9 on the surface 6 of the platform 3 by means of screws 14.

Figure 3:
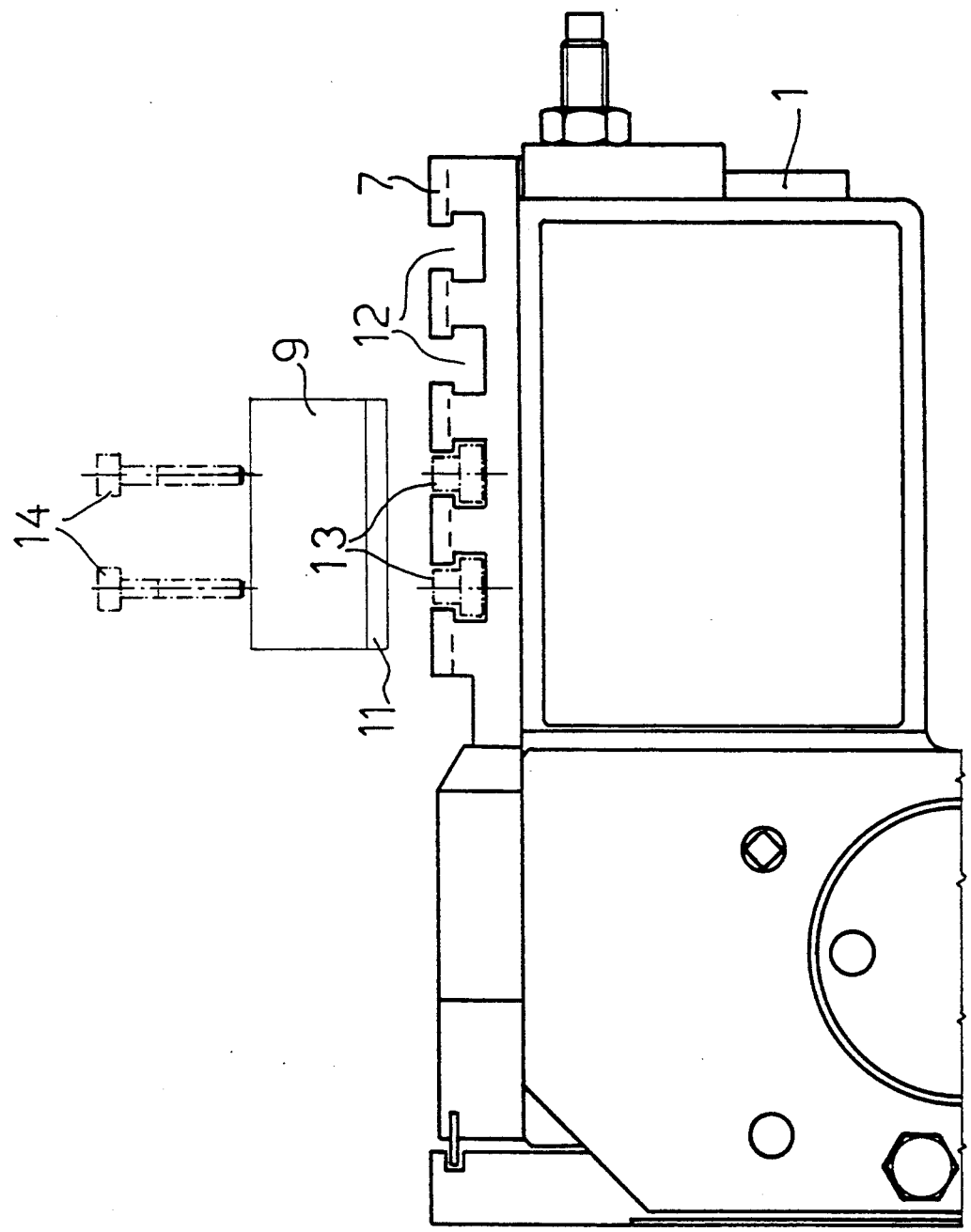
FIG. 3 shows the receiving device and the toolholder viewed in the direction of the arrow f of FIG. 2.
Figure 4:
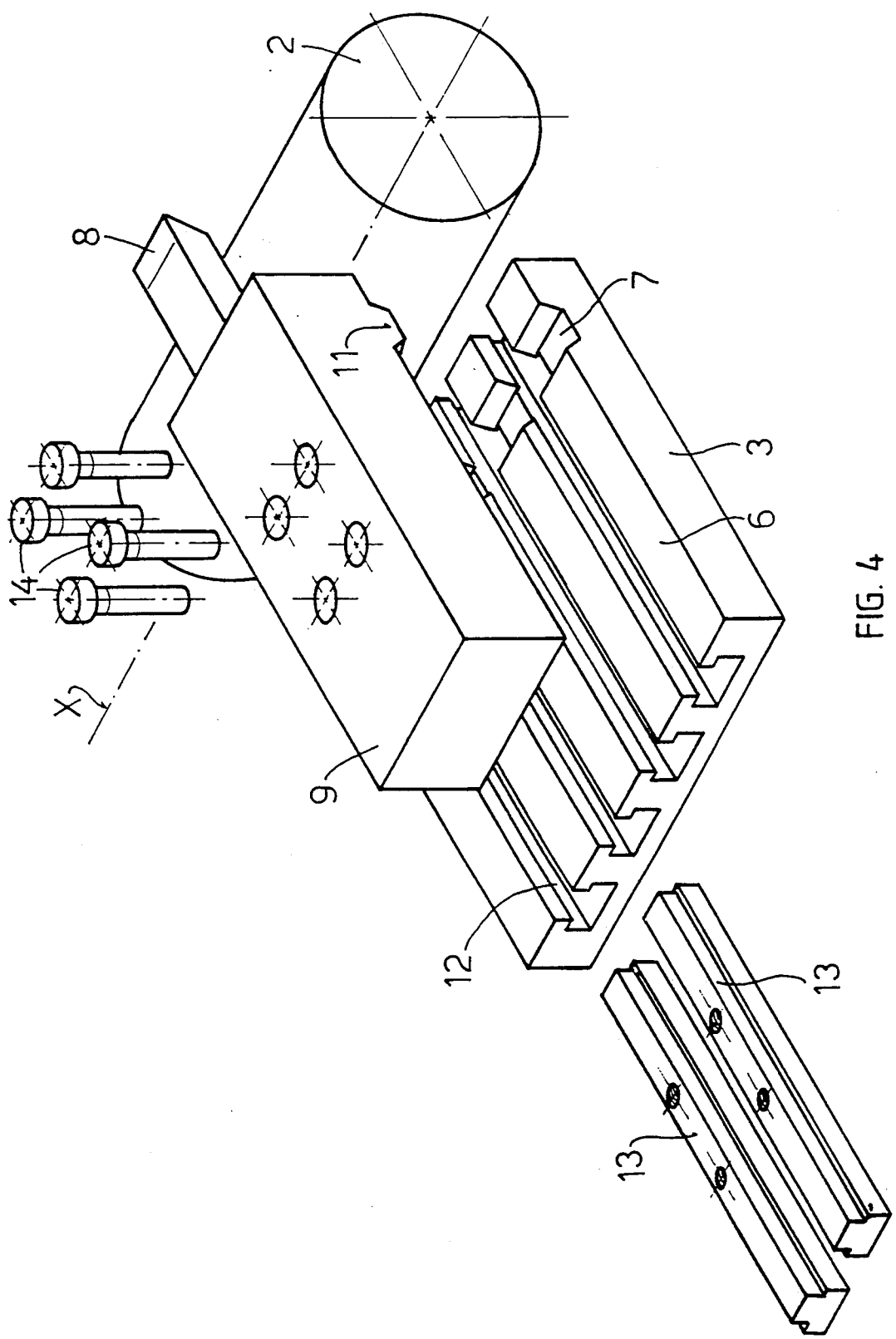
FIG. 4 shows in schematic form an exploded and perspective view of the toolholder.

From FIGS. 2, 3 and 4 it can be seen that the platform 3 has a plurality of parallel grooves 12 distributed over the entire surface of the platform 12 [sic]. It is thus possible to choose the operationally most suitable position of the toolholder 9 with respect to the platform 3, in accordance with the dimensions of the holding device 9 and also of the tool 8.

As can be seen in particular from FIG. 4, the T-shaped grooves 12 are arranged radially with respect to the axis X of the workpiece 2 to be machined. Therefore it advantageously becomes possible to introduce the T-shaped clamping strips 13 radially from outside the machine into the platform 3. Thus, the introduction of the T-shaped clamping strips may be performed very rapidly. Since the sides of the platform 3 are not obstructed, as in the known embodiments, by additional laterally arranged equipment of the machine, particularly easy and unhindered insertion of the clamping strips 13 is possible.

I claim:

1. A toolholder assembly for an automatic lathe including:
   a toolholder for holding a tool for machining a workpiece, said toolholder having a fillet extending from a bottom surface of said toolholder parallel to a longitudinal axis of the workpiece;
   a receiving device for receiving the toolholder, said receiving device having a groove formed in a top supporting surface of said receiving device so that said groove is oriented parallel to the longitudinal axis of the workpiece and so that said fillet is seatable in said groove, said receiving device also having parallel securing grooves in said top supporting surface which extend in a radial direction with respect to the longitudinal axis of the workpiece; and
   clamping means engageable with said securing grooves and said toolholder for securing the toolholder to said receiving device, said clamping means being aligned with the radial direction to allow said toolholder to be withdrawn from the receiving device in the radial direction.

2. A toolholder assembly according to claim 1, wherein the groove arranged parallel to the longitudinal axis of the workpiece to be machined has a prismatic cross-section.

3. A toolholder assembly according to claim 1, wherein the groove arranged parallel to the longitudinal axis of the workpiece has a frustoconical cross-sectional shape and laterally arranged walls are provided that taper downwards.

4. A toolholder assembly according to claim 1, wherein the fillet projecting from of the toolholder is formed integrally with said toolholder as a single piece with the toolholder.

5. A toolholder assembly according to claim 1, wherein said clamp means includes clamping strips that are insertable into said securing grooves and screws that pass through holes in said toolholder so that said screws engage said clamping strips and join together said toolholder and said receiving device.

6. A toolholder assembly according to claim 5, wherein said clamping strips and said securing grooves have a T-shaped cross-section.

* * * * *